(12) United States Patent
Kim

(10) Patent No.: US 7,281,373 B2
(45) Date of Patent: Oct. 16, 2007

(54) FLUID PUMP CONTROL DEVICE FOR WHEEL LOADERS

(75) Inventor: Hyeong Ho Kim, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 71 days.

(21) Appl. No.: 11/320,129

(22) Filed: Dec. 27, 2005

(65) Prior Publication Data

US 2006/0137337 A1 Jun. 29, 2006

(30) Foreign Application Priority Data

Nov. 29, 2004 (KR) .................. 10-2004-0114576

(51) Int. Cl.
*F16D 31/02* (2006.01)
(52) U.S. Cl. .............................. 60/449; 60/430; 60/444
(58) Field of Classification Search .................. 60/430, 60/432, 444, 449, 486
See application file for complete search history.

(56) References Cited

U.S. PATENT DOCUMENTS 4,561,250 A * 12/1985 Aoyagi et al. ............... 60/449
6,321,535 B2 * 11/2001 Ikari et al. ................... 60/449
6,672,055 B1 * 1/2004 Konishi et al. ............... 60/449

* cited by examiner

*Primary Examiner*—Michael Leslie
(74) *Attorney, Agent, or Firm*—Lee, Hong, Degerman, Kang & Schmadeka

(57) ABSTRACT

A fluid pump control device for wheel loaders includes an engine for driving an axle through a transmission, a main pump, a variable-displacement steering pump with a pump regulator, an auxiliary pump, an electronic proportional control valve provided on a discharge quantity control signal line leading to the pump regulator for variably controlling a pilot pressure conveyed the pump regulator, a hydraulic load detector for detecting a real hydraulic load (Px), an engine revolution detector for detecting the number of revolution (N1) of the engine, a transmission revolution detector for detecting the number of output shaft revolution (N2) of the transmission. A controller is adapted to control the electronic proportional control valve and hence the fluid discharge quantity of the steering pump, based on the real hydraulic load (Px), the number of revolution (N1) of the engine and the number of output shaft revolution (N2) of the transmission.

3 Claims, 2 Drawing Sheets

FLUID PUMP CONTROL DEVICE FOR WHEEL LOADERS

This application claims the benefit of the Korean Patent Application No. 10-2004-0114576, filed on Dec. 29, 2004, which is hereby incorporated by reference as if fully set forth herein.

BACKGROUND OF THE INVENTION

1. Field of the Invention

The present invention is directed to a fluid pump control device for wheel loaders and, more specifically, to a fluid pump control device for wheel loaders capable of distributing and controlling the output power of an engine in an optimized manner depending on the magnitude of a hydraulic working load and a travel load.

2. Description of the Related Art

Wheel loaders, one kind of heavy construction equipments, includes a single engine to which are operatively connected an axle and a fluid pump in such a manner that the engine provides both a travel power for rotating the axle and a hydraulic working power for driving a fluid pressure generating apparatus, e.g., fluid pump, that actuates front working implements such as a boom, an arm, a bucket and the like.

More specifically, as shown in FIG. 1, an engine 8 of wheel loaders is connected to an axle through a transmission 9 to drive a vehicle forwards or rearwards and also associated with a main pump P1, a steering pump P2 and an auxiliary pump P3. Accordingly, the output power of the engine 8 is split into an axle driving power and a hydraulic working power.

The main pump P1 is designed to discharge and supply a hydraulic flow to actuators for operating front working implements such as a boom, an arm, a bucket and the like. The steering pump P2 generates a hydraulic flow which is either to be supplied to a steering device 7 or merged with the hydraulic flow from the main pump P1 and then supplied to the front working implements.

The auxiliary pump P3 feeds a hydraulic flow to a brake device 12 and a joystick valve 15. Responsive to fore-and-aft or side-by-side motion of a manipulation lever 15a, the joystick valve 15 is adapted to reduce the pressure of the hydraulic flow supplied from the auxiliary pump P3 and then feed pilot signal pressures to a control valve 1 that serves to control movement of the front working implements.

As briefly noted above, the prior art wheel loaders are designed to divide the output power of the engine into a power required for travel and a power for driving fluid pressure generating devices, including the main pump P1, the steering pump P2 and the auxiliary pump P3.

Hydraulic control devices of the conventional wheel loaders are classified into two types depending on how to control the hydraulic flows discharged by pumps in case that a hydraulic working load and a travel load take place simultaneously as in the process of performing the tasks of hydraulic working and traveling at the same time. One is a combination type hydraulic control device that merges a hydraulic flow generated by a steering pump with a hydraulic flow discharged by a main pump to enable them to cooperatively undertake the hydraulic working load. The other is a self-reliance type hydraulic control device that allows the main pump hydraulic flow to undertake the hydraulic working load, while permitting the steering pump hydraulic flow to undertake the travel load.

In the combination type hydraulic control device as shown in FIG. 1, which makes use of the hydraulic flows discharged by the main pump and the steering pump, the output power of an engine is distributed to the side of the hydraulic working load in the first place. This helps to improve the performance of dealing with the hydraulic working load but may result in a reduced travel torque.

On the other hand, the self-reliance type hydraulic control device provides an advantage in that a sufficiently great travel torque can be acquired even when the tasks of traveling and working are performed simultaneously. However, the self-reliance type hydraulic control device is inferior in terms of the hydraulic working performance because the hydraulic flow of the main pump alone is used to deal with the hydraulic working load.

In a nutshell, the two types of hydraulic control devices employed in the prior art wheel loaders are focused on one of the tasks of hydraulic working load and traveling and therefore fail to exhibit satisfactory performance with respect to the other task.

SUMMARY OF THE INVENTION

Taking into account the afore-mentioned and other problems inherent in the prior art hydraulic control devices, it is an object of the present invention to provide a fluid pump control device for wheel loaders that can distribute the output power of an engine against a hydraulic working load and a travel load in an optimized manner to thereby satisfy both the hydraulic working performance and the traveling performance particularly when the hydraulic working load and the travel load are applied at the same moment.

With this object in mind, the present invention provides a fluid pump control device for wheel loaders, comprising: an engine for driving an axle through a transmission; a main pump driven by the engine for supplying a hydraulic flow to front working implements; a variable-displacement steering pump driven by the engine for discharging a hydraulic flow to be supplied to a steering device or to be merged with the hydraulic flow of the main pump and then supplied to the front working implements, the steering pump including a swash plate and a pump regulator for regulating an inclination angle of the swash plate to vary the fluid quantity discharged by the steering pump; an auxiliary pump driven by the engine for supplying a hydraulic flow to a working implement control valve and a brake device; an electronic proportional control valve provided on a discharge quantity control signal line for variably controlling a pilot pressure conveyed the pump regulator, the discharge quantity control signal line bifurcated from a pilot signal line of a joystick valve and connected to the pump regulator; a hydraulic load detection means for detecting a real hydraulic load (Px) based on the fluid pressure of the hydraulic flow discharged by the main pump; an engine revolution detection means for detecting the number of revolution (N1) of the engine; a transmission revolution detection means for detecting the number of output shaft revolution (N2) of the transmission; and a controller for calculating the ratio of the transmission output shaft revolution number (N2) to the engine revolution number (N1) to find a real travel load (La), calculating the ratio of the real travel load (La) to a predetermined maximum travel load (Lmax) to find a travel load ratio (Rt), calculating the ratio of the real hydraulic load (Px) to a predetermined maximum hydraulic load (Pmax) to find a hydraulic load ratio (Rp), controlling the electronic proportional control valve in such a manner as to reduce the fluid discharge quantity of the steering pump if the travel load ratio (Rt) exceeds a predetermined reference travel load value and if the hydraulic load ratio (Rp) is greater than a predetermined reference hydraulic load value, and controlling the electronic proportional control valve in such a manner as to maximize the fluid discharge quantity of the steering pump if one of the travel load ratio (Rt) and the hydraulic load ratio (Rp) fails to reach the corresponding reference value.

In a fluid pump control device of the present invention, it is preferred that the controller be adapted to minimize an aperture area of the electronic proportional control valve if the travel load ratio (Rt) exceeds the predetermined reference travel load value and if the hydraulic load ratio (Rp) is greater than the predetermined reference hydraulic load value, but minimize the aperture area of the electronic proportional control valve if one of the travel load ratio (Rt) and the hydraulic load ratio (Rp) fails to reach the corresponding reference value.

In a fluid pump control device of the present invention, it is preferred that the predetermined reference travel load value and the predetermined reference hydraulic load value be equal to 0.85.

According to the fluid pump control device for wheel loaders as summarized above, in the event that a wheel loader performs the tasks of front working and traveling independently or in combination, an electronic proportional control valve is controlled depending on the ratio of a real travel load to a predetermined maximum travel load and the ratio of a real hydraulic load to a predetermined maximum hydraulic load, thereby varying the fluid discharge quantity of a steering pump. This ensures that the output power of an engine is utilized with increased efficiency and further that the movement of the wheel loader is controlled in an optimized condition depending on the travel load and the hydraulic working load.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

A preferred embodiment of a fluid pump control device for wheel loaders in accordance with the present invention will now be described in detail with reference to the accompanying drawings.

Figure 1:
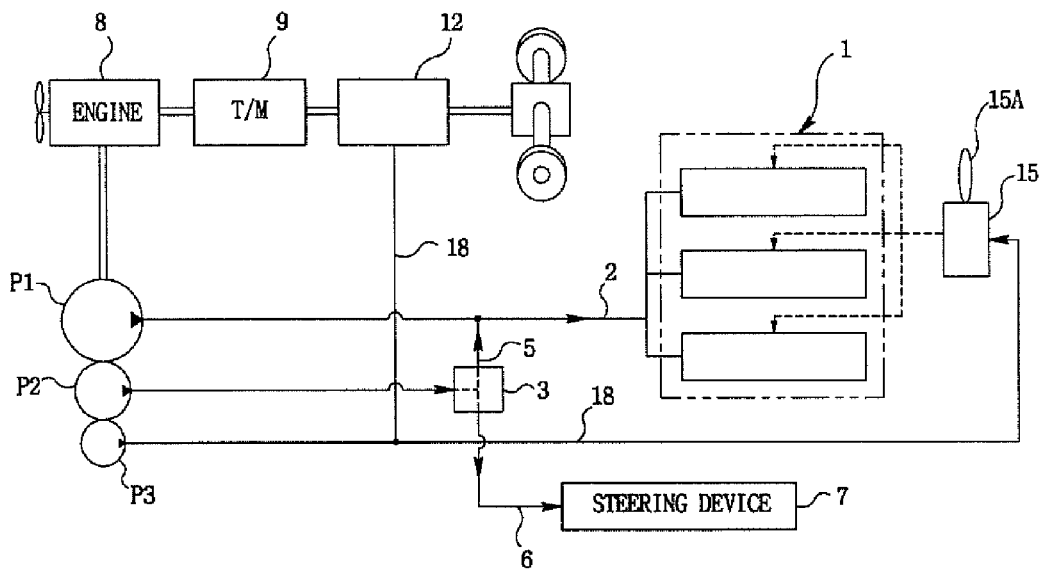
FIG. 1 schematically shows a prior art fluid pump control device for wheel loaders.
Figure 2:
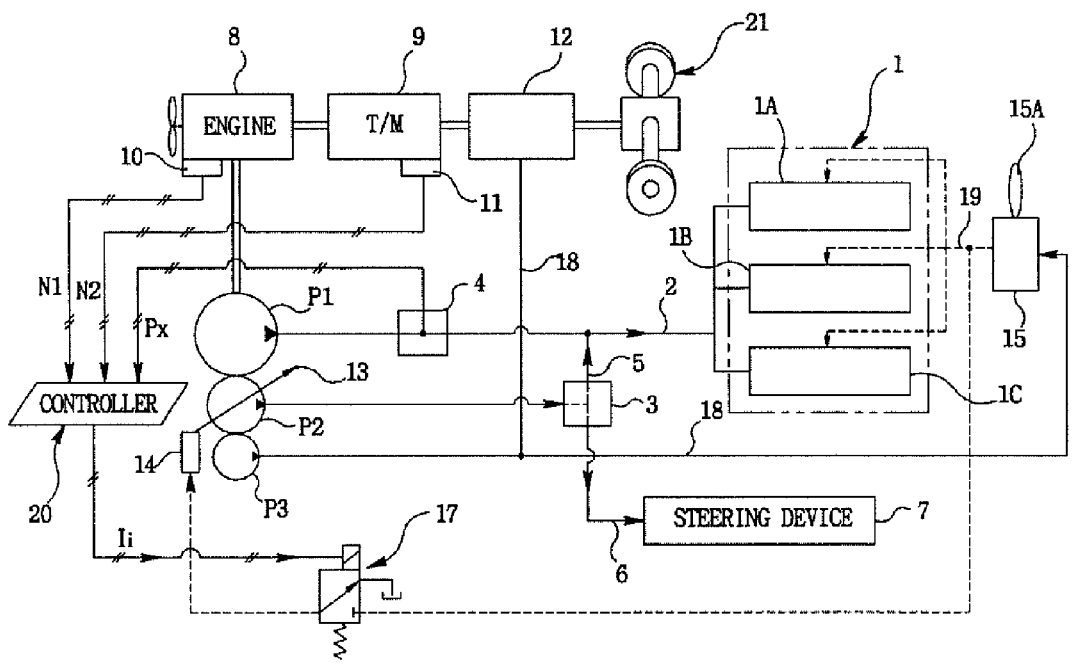
FIG. 2 is a schematic diagram showing a fluid pump control device for wheel loaders in accordance with the present invention.

FIG. 2 is a schematic diagram showing a fluid pump control device for wheel loaders in accordance with the present invention. Like parts or components in FIG. 2 are designated by the same reference numerals as in FIG. 1.

Referring to FIG. 1, a fluid pump control device for wheel loaders includes an engine 8 operatively connected to an axle 21 through a transmission 9 to move a wheel loader forwards or rearwards. The engine 8 distributes its output power to a main pump P1, a steering pump P2 and an auxiliary pump P3, as well as to the axle 21.

The main pump P1 is rotatingly driven by the engine 8 to discharge a hydraulic flow which in turn is supplied through a main fluid pressure line 2 to actuators of front working implements, such as a bucket cylinder and a boom cylinder, to operate the front working implements in a controlled manner. In other words, the hydraulic flow discharged by the main pump P1 is conveyed through the main fluid pressure line 2 to a control valve 1 having a plurality of control spools 1A, 1B, 1C and then distributed to the actuators of the front working implements under a control of the control spools 1A, 1B, 1C so that the front working implements can perform the tasks assigned thereto.

The steering pump P2 is adapted to discharge and supply a hydraulic flow to a steering device 7 through a steering line 6 to operate the steering device 7 in the travel process of the wheel loader. Alternatively, the hydraulic flow discharged by the steering pump P2 may be fed to the main fluid pressure line 2 through a confluence line 5 under the action of an unloading valve 3 and then merged with the hydraulic flow of the main pump P1 to operate the front working implements with a greater hydraulic force.

The auxiliary pump P3 serves to discharge and supply a hydraulic flow to a brake device 12 and a joystick valve 15 through an auxiliary fluid pressure line 18. Responsive to fore-and-aft or side-by-side motion of a manipulation lever 15A, the joystick valve 15 creates pilot signal pressures in a pilot signal line 19, which pilot signal pressures are used in shifting the control spools 1A, 1B, 1C of the control valve 1. To be more specific, the manual actuation of the manipulation lever 15A causes the joystick valve 15 to reduce the pressure of the hydraulic flow supplied through the auxiliary fluid pressure line 18 from the auxiliary pump P3, thus generating the pilot signal pressures for controlling the positions of the respective control spools 1A, 1B, 1C of the control valve 1.

In the meantime, the steering pump P2 is a variable-displacement pump that discharges a varying amount of hydraulic flow depending on the inclination angle of a swash plate 13. A pump regulator 14 is connected to the swash plate 13 to variably control the inclination angle thereof. The pump regulator 14 is in fluid communication with the pilot signal line 19 through a discharge quantity control signal line 16. This enables the pump regulator 14 to regulate the inclination angle of the swash plate 13 and hence the fluid quantity discharged by the steering pump P2, in proportion to the moving amount of the manipulation lever 15A, i.e., the magnitude of the pilot signal pressures conveyed through the discharge quantity control signal line 16 to the pump regulator 14.

More specifically, if the manipulation lever 15A is moved to a greater extent to thereby increase the magnitude of the pilot signal pressures in the pilot signal line 19, the pilot signal pressures of increased magnitude is transmitted to the pump regulator 14 via the discharge quantity control signal line 16 so that the pump regulator 14 can increase the inclination angle of the swash plate 13 and, consequently, the fluid quantity discharged by the steering pump P2.

To the contrary, if the moving amount of the manipulation lever 15A is decreased, the magnitude of the pilot signal pressures created by the joystick valve 15 becomes smaller and the pilot signal pressures of decreased magnitude is transmitted to the pump regulator 14 via the discharge quantity control signal line 16 so that the pump regulator 14 can reduce the inclination angle of the swash plate 13 and, consequently, the fluid quantity discharged by the steering pump P2.

An electronic proportional control valve 17 is provided on the discharge quantity control signal line 16 in such a manner that the aperture area of the electronic proportional control valve 17 can be varied in response to an electric control current (Ii) inputted from a controller 20. By varying its aperture area in response to the electric control current (Ii) supplied from a controller 20, the electronic proportional control valve 17 functions to variably control the pilot signal pressures transmitted to the pump regulator 14 of the steering pump P2 via the discharge quantity control signal line 16.

The controller 20 is adapted to supply a controlled amount of electronic control current (Ii) to the electronic proportional control valve 17 depending on the travel load of the axle 21 and the hydraulic working load of the front working implements, consequently controlling the fluid quantity discharged by the steering pump P2.

With the use of the electronic control current (Ii), the controller 20 controls operation of the electronic proportional control valve 17. The number of revolution (N1) of the engine 8 is detected and inputted to the controller 20 by an engine revolution detection means 10 attached to the engine 8. A transmission revolution detection means 11 is attached to the transmission 9 for detecting the number of output shaft revolution (N2) of the transmission 9. The transmission output shaft revolution number (N2) thus detected is inputted to the controller 20. A hydraulic load detection means 4 is provided on the main fluid pressure line 2 for detecting a real hydraulic load (Px) based on the fluid pressure of the hydraulic flow discharged by the main pump (P1) and supplied to the actuators of the front working implement. A pressure sensor may be used as the hydraulic load detection means 4.

Figure 3:
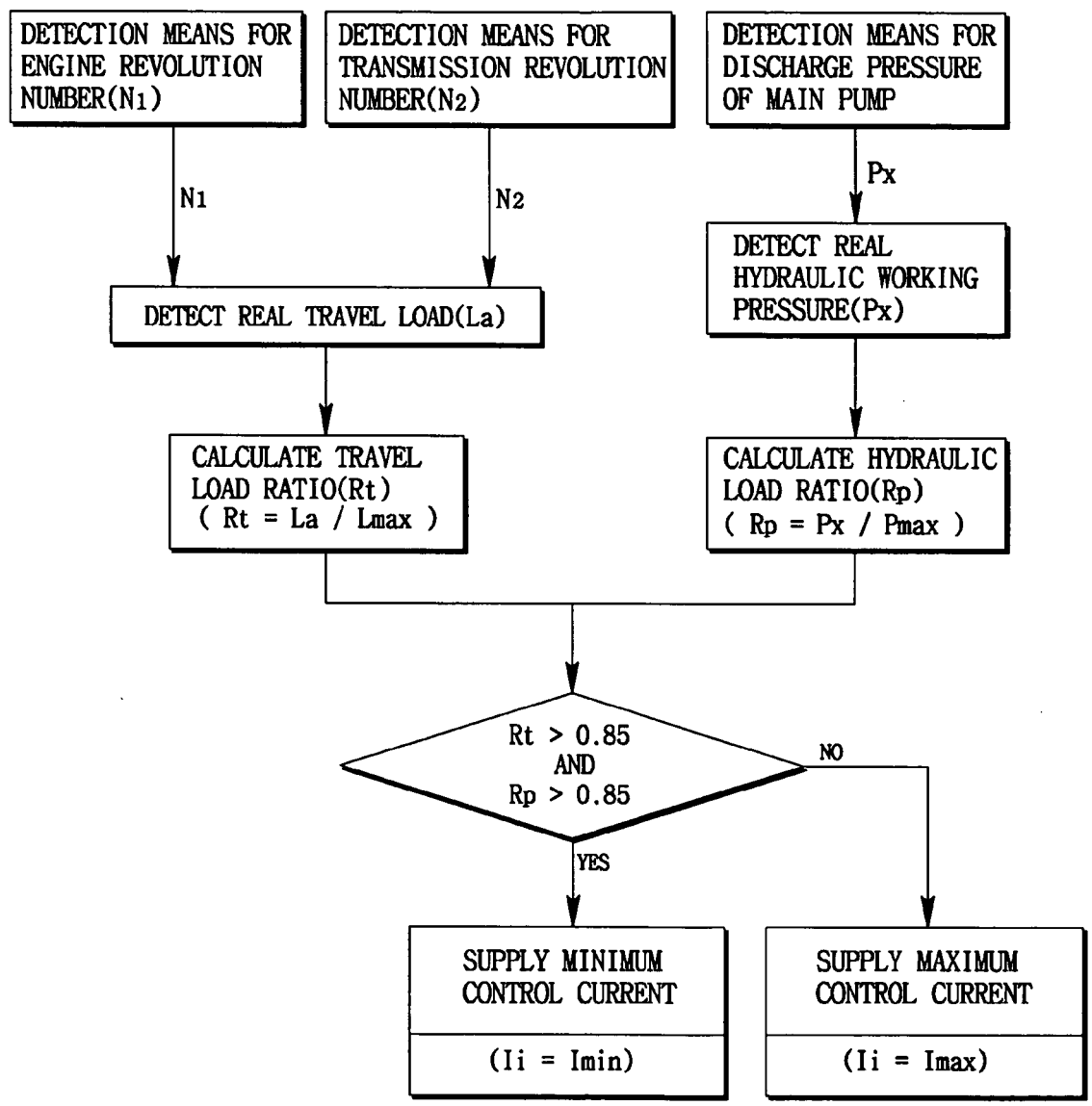
FIG. 3 is a flowchart illustrating various steps conducted by a controller of the fluid pump control device for wheel loaders shown in FIG. 2.

Turning to FIG. 3, there is illustrated various steps that are conducted by the controller 20 of the fluid pump control device for wheel loaders in accordance with the present invention.

First of all, he controller 20 calculates the ratio of the transmission output shaft revolution number (N2) detected by the transmission revolution detection means 11 to the engine revolution number (N1) detected by the engine revolution detection means 10 to find a real travel load (La) and then calculates the ratio of the real travel load (La) thus obtained to a predetermined maximum travel load (Lmax) to find a travel load ratio (Rt).

Furthermore, the controller 20 calculates the ratio of the real hydraulic load (Px) detected by the hydraulic load detection means 4 to a predetermined maximum hydraulic load (Pmax) to find a hydraulic load ratio (Rp). The maximum hydraulic load (Pmax) may be equal to the relief pressure of a relief valve associated with the main pump P1.

Subsequently, the controller 20 determines whether the travel load ratio (Rt) exceeds a predetermined reference travel load value, e.g., 0.85, and whether the hydraulic load ratio (Rp) is greater than a predetermined reference hydraulic load value, e.g., 0.85.

At the end of such determination, if the travel load ratio (Rt) exceeds the reference travel load value and if the hydraulic load ratio (Rp) is greater than the reference hydraulic load value, the controller 20 regards the travel load applied to the engine 8 as of relatively great value and feeds a minimum control current (Imin) to the electronic proportional control valve 17 to thereby reduce the fluid discharge quantity of the steering pump P2.

Responsive to the minimum control current (Imin) supplied from the controller 20, the electronic proportional control valve 17 is so shifted as to minimize its aperture area and hence the pilot control pressures acting on the pump regulator 14 through the discharge quantity control signal line 16. This prompts the pump regulator 14 to minimize the inclination angle of the swash plate 13 of the steering pump P2, thus allowing the steering pump P2 to discharge a minimum amount of hydraulic flow. Accordingly, the output power of the engine 8 is distributed to the axle 21 more than to the steering pump P2, which results in an improved travel performance.

On the other hand, if one of the travel load ratio (Rt) and the hydraulic load ratio (Rp) fails to reach the corresponding reference value, the controller 20 regards the travel load applied to the engine 8 as of relatively small value and feeds a maximum control current (Imax) to the electronic proportional control valve 17 to thereby maximize the fluid discharge quantity of the steering pump P2.

In response to the maximum control current (Imax) supplied from the controller 20, the electronic proportional control valve 17 is so shifted as to maximize its aperture area and hence the pilot control pressures acting on the pump regulator 14 through the discharge quantity control signal line 16. This prompts the pump regulator 14 to maximize the inclination angle of the swash plate 13 of the steering pump P2, thus permitting the steering pump P2 to discharge a maximum amount of hydraulic flow. The hydraulic flow thus discharged is merged with the hydraulic flow of the main pump P1 to operate the front working implements with an increased hydraulic force. Accordingly, the output power of the engine 8 is distributed to the steering pump P2 more than to the axle 21, which leads to an improved hydraulic working performance.

As described in the foregoing, the fluid pump control device for wheel loaders of the present invention can satisfy both the travel performance and the hydraulic working performance and enable the wheel loader to perform its tasks in an optimized condition. This is because the controller regulates the fluid quantity discharged by the steering pump in such a manner that the output power of the engine can be properly distributed to the axle and the pumps depending on the travel load and the hydraulic working load.

Although a preferred embodiment of the present invention has been described herein above, it will be apparent to those skilled in the art that various changes or modifications may be made thereto within the scope of the invention defined by the appended claims.

What is claimed is:

1. A fluid pump control device for wheel loaders, comprising:
    an engine (8) for driving an axle through a transmission (9);
    a main pump (P1) driven by the engine (8) for supplying a hydraulic flow to front working implements;
    a variable-displacement steering pump (P2) driven by the engine (8) for discharging a hydraulic flow to be supplied to a steering device (7) or to be merged with the hydraulic flow of the main pump (P1) and then supplied to the front working implements, the steering pump (P2) including a swash plate (13) and a pump regulator (14) for regulating an inclination angle of the swash plate (13) to vary the fluid quantity discharged by the steering pump (P2);
    an auxiliary pump (P3) driven by the engine (8) for supplying a hydraulic flow to a working implement control valve (1) and a brake device (12);

an electronic proportional control valve (17) provided on a discharge quantity control signal line (16) for variably controlling a pilot pressure conveyed the pump regulator (14), the discharge quantity control signal line (16) bifurcated from a pilot signal line (19) of a joystick valve (15) and connected to the pump regulator (14);

a hydraulic load detection means (4) for detecting a real hydraulic load (Px) based on the fluid pressure of the hydraulic flow discharged by the main pump (P1);

an engine revolution detection means (10) for detecting the number of revolution (N1) of the engine (8);

a transmission revolution detection means (11) for detecting the number of output shaft revolution (N2) of the transmission (9); and a controller (20) for calculating the ratio of the transmission output shaft revolution number (N2) to the engine revolution number (N1) to find a real travel load (La), calculating the ratio of the real travel load (La) to a predetermined maximum travel load (Lmax) to find a travel load ratio (Rt), calculating the ratio of the real hydraulic load (Px) to a predetermined maximum hydraulic load (Pmax) to find a hydraulic load ratio (Rp), controlling the electronic proportional control valve (17) in such a manner as to reduce the fluid discharge quantity of the steering pump (P2) if the travel load ratio (Rt) exceeds a predetermined reference travel load value and if the hydraulic load ratio (Rp) is greater than a predetermined reference hydraulic load value, and controlling the electronic proportional control valve (17) in such a manner as to maximize the fluid discharge quantity of the steering pump (P2) if one of the travel load ratio (Rt) and the hydraulic load ratio (Rp) fails to reach the corresponding reference value.

2. The device as recited in claim 1, wherein the controller (20) is adapted to minimize an aperture area of the electronic proportional control valve (17) if the travel load ratio (Rt) exceeds the predetermined reference travel load value and if the hydraulic load ratio (Rp) is greater than the predetermined reference hydraulic load value, but minimize the aperture area of the electronic proportional control valve (17) if one of the travel load ratio (Rt) and the hydraulic load ratio (Rp) fails to reach the corresponding reference value.

3. The device as recited in claim 2, wherein the predetermined reference travel load value and the predetermined reference hydraulic load value are equal to 0.85.

* * * * *